I. A. WILLIAMS.
Locomotive Lamp.
No. 2,133.
Reissued Dec. 19, 1865.
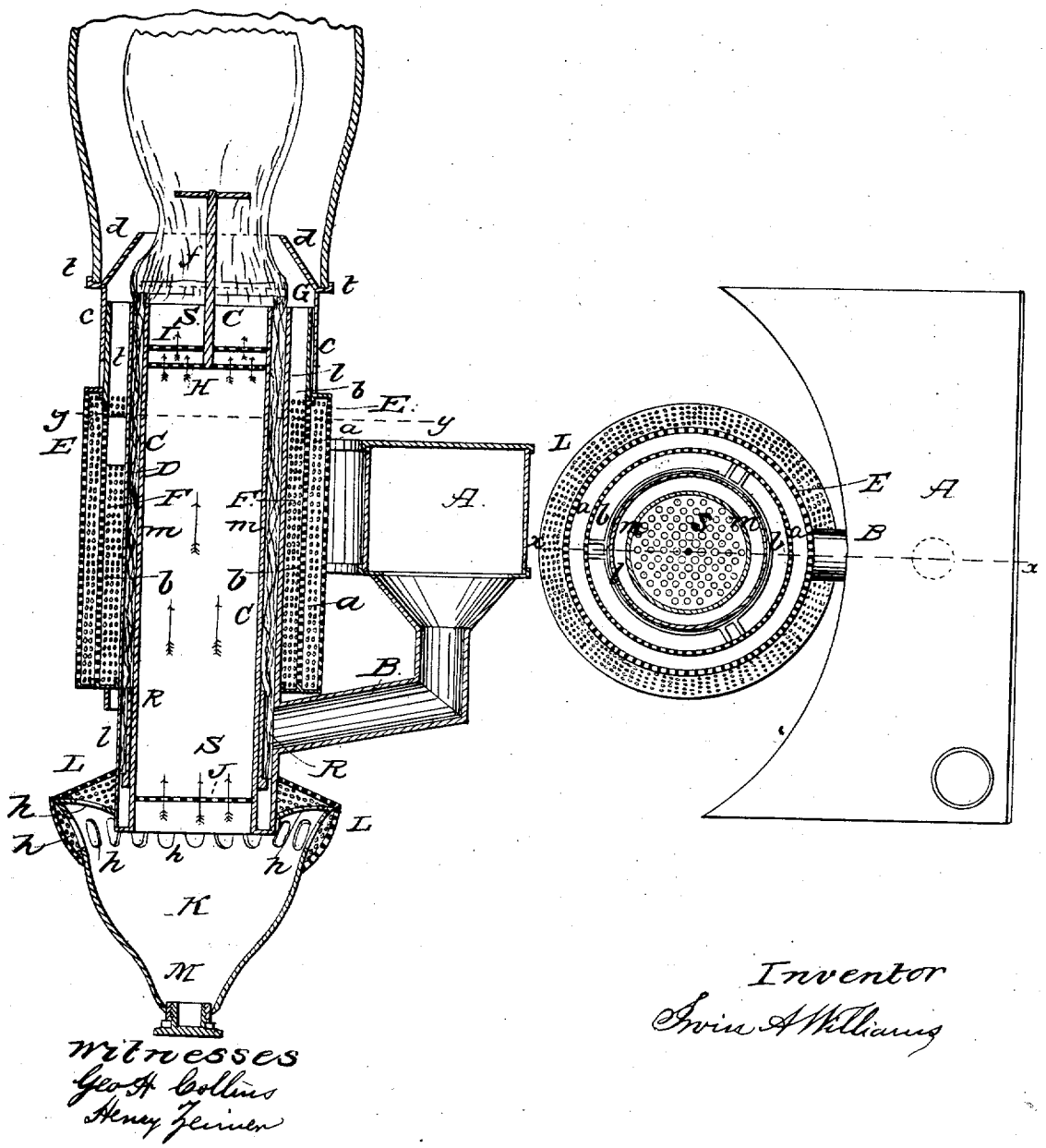
Witnesses
Geo. A. Collins
Henry Zeiner
Inventor
Irvin A. Williams
N. PETERS, Photo-Lithographer, Washington, D. C.

UNITED STATES PATENT OFFICE.

IRVIN A. WILLIAMS, OF UTICA, NEW YORK.

IMPROVEMENT IN LOCOMOTIVE-LAMPS.

Specification forming part of Letters Patent No. 35,122, dated April 29, 1862; Reissue No. 2,133, dated December 19, 1865.

*To all whom it may concern:*

Be it known that I, IRVIN A. WILLIAMS, of Utica, in the county of Oneida and State of New York, have invented certain new and useful Improvements in Locomotive-Lamps; and I do hereby declare that the following is a full, clear, and exact description of the same, reference being had to the accompanying drawings, in which—

Figure 1 represents a central vertical section of a lamp constructed according to my invention. Fig. 2 represents a horizontal section of the same at the line *y y* of Fig. 1. The line *x x* in Fig. 2 represents the place at which the sectional view, Fig. 1, is drawn.

The object of my invention is to permit coal-oil or kerosene to be used in lamps for locomotive head-lights with success, and to obtain full advantage of its great light-producing capacity.

In locomotive head-lights it is important that the greatest amount of light should be concentrated in the smallest practicable space, in order that the light may be as nearly as possible in the focus of the reflector, which throws it forward of the locomotive. It is also important in lamps burning kerosene that the flame should be protected from irregular currents of air, which tend to produce flickering. The first requirement has been attained to some extent by the use of a tubular wick, from which the fluid burns; but the lamps in which such wicks were used did not contain instrumentalities which enabled them to burn without smoke all the coal-oil which such a wick is capable of supplying.

The improvements which constitute the invention or subject-matter of this patent consist of novel combinations of a circular hollow wick-tube (by which I mean a wick-tube suitable for holding a tubular wick and admitting air to its interior) with various other instrumentalities which, when combined as hereinafter described, produce a lamp which is suitable for burning coal-oil in a locomotive head-light, and is more efficient for that purpose than any lamp heretofore known, because it furnishes the greatest quantity of light from a wick of a given size without material flickering.

The first of these improvements consists of the combination of a circular hollow wick-tube with a perforated air-screen to regulate the passage of air to the exterior of the flame, and a cap-deflector to form a combustion-chamber above the wick, from the orifice of which chamber the flame issues in intimate contact with the exterior and interior currents of air after it has formed above the wick within the combustion-chamber and its carbonaceous constituents have attained a glowing heat therein.

The second improvement consists of the combination of the said circular hollow wick-tube, perforated air-screen for the exterior current of air, and cap-deflector, with a lateral reservoir for the oil, by which I mean a reservoir so combined and arranged that the head from which the oil is supplied is at one side of the wick-tube and above its lower end, whereby the reservoir can be placed outside of the reflector of the head-light, and the oil can nevertheless be supplied by gravitation at a level sufficiently near the burning part of the wick to keep it freely supplied with oil.

The third improvement consists of the combination of the said circular hollow wick-tube, perforated air-screen for the exterior current of air, and cap-deflector, with button arranged above the orifice of the cap-deflector in such manner as to spread the flame after it issues from the orifice of the cap-deflector, thereby lessening its height and confining it more nearly to the focus of the reflector of the head-light.

The fourth improvement consists of the combination of the said circular hollow wick-tube, perforated air-screen for the exterior current of air, and cap-deflector with a thimble wick-holder for holding and moving the wick in the circular hollow wick-tube.

The fifth improvement consists of the combination of the said circular hollow wick-tube and lateral oil-reservoir with a perforated air-screen to regulate the passage of air to the interior of the flame or wick-tube.

The sixth improvement consists of the combination of the said circular hollow wick-tube, perforated air-screen for the interior current of air, and lateral oil-reservoir with the said cap-deflector.

The seventh improvement consists of the combination of the said circular hollow wick-tube, cap-deflector, and perforated air-screen for the interior current of air, with a button to spread the flame above the orifice of the cap-deflector.

The eighth improvement consists of the combination of the said circular hollow wick-tube, cap-deflector, lateral oil-reservoir, and perforated air-screen for the interior current of air, with a button to spread the flame above the orifice of the cap-deflector.

The ninth improvement consists of the combination of the said circular hollow wick-tube and cap-deflector with perforated air-screens for both the exterior and interior currents of air.

The tenth improvement consists of the combination of the said circular hollow wick-tube, cap-deflector, and perforated air-screen for the exterior current of air, with a close gallery to support the chimney, by which I mean a gallery combined with the other members in such manner that direct currents of air are not permitted to pass under the chimney and over the deflector, to cause the flame to flicker when the locomotive is in motion.

The last of my improvements consists of the combination in a lamp of the following instrumentalities—viz, the aforesaid circular hollow wick-tube, thimble wick-holder, cap-deflector, button, perforated air-screens for the exterior and interior currents of air, and lateral oil-reservoir.

The lamp represented in the accompanying drawings embodies all my improvements, being an example of the best mode of embodying the invention known to me at the date of my application for the original patent. It has a circular hollow wick-tube, C, composed of an interior cylinder, *m*, and an exterior cylinder, *l*, which are separated by an annular space in which the tubular wick D is contained, but are connected together at their lower ends so as to retain the oil. This circular hollow wick-tube is provided with a thimble wick-holder, R, having the form of a short cylinder, to the exterior of which the lower end of the wick is secured, so that the wick may be moved up and down in the wick-tube, by moving the thimble wick-holder by means of a rack and pinion of the usual construction for such purpose, or by other suitable mechanism. The employment of such a wick-holder permits the wick to be gradually exhausted, by burning and trimming, down to the fag end, which is secured to the thimble, without requiring the wick to be shifted upon the wick-holder.

The perforated air-screen for the exterior current of air is by preference made of two cylinders, E F, of the material known as "perforated metal," although one cylinder only may be used, if deemed expedient. The perforations of this material (perforated metal) are so small that the air is compelled to pass through them slowly in minute streams which mingle in the space *b* within the air-screen, so that sudden variations in the pressure of the exterior air do not materially affect the flow within the air-screen, and consequently do not cause the flame to flicker materially. This perforated air-screen is so combined with the circular hollow wick-tube C and the cap-deflector hereinafter described that the current of air which passes through the exterior of the flame through the cap-deflector is compelled to pass through the perforations of the perforated air-screen. Its inner cylinder, F, is sustained by the circular hollow wick-tube C. The outer cylinder, E, is separated from the inner by a space, *a*, but is sustained by the inner cylinder, F. The cap-deflector G is situated at the upper end of the wick-tube C, being supported by the inner perforated cylinder, F. It is composed of two parts, the lower, *c*, cylindrical, and the upper, *d*, conical, terminating at the orifice from which the flame issues. This cap-deflector, as represented in the drawings, extends above the wick D when the latter is at the highest position it occupies while the lamp is burning, and its interior forms a combustion-chamber above the wick, in which the flame is permitted to form before it makes its exit from the orifice of the cap-deflector. In these two respects the cap-deflector differs from the old cones used to deflect the exterior current of air in the old camphene or spirit-lamps, in which the cone was placed so low that its upper orifice was on a level or thereabouts with the upper edge of the wick when in its highest position for burning, so that there was no combustion-chamber above the wick in which the flame could form after leaving the wick. It also differs from the said cones in the respect that it directs the strongest current of air upon the flame at a considerable distance above the wick, in such manner that the flame is contracted upon and brought into intimate contact with the current of air passing up its interior from the hollow wick-tube, so that an intense combustion of the carbonaceous matter of the flame is effected after the particles have had time to attain a glowing heat during their passage through the combustion-chamber.

The wick-tube is connected by a tubular passage, B, with a lateral reservoir, A, for the oil, so that the latter is supplied to the wick by gravitation, without the necessity of employing mechanism to force it up to the wick. The lateral reservoir is a matter of great importance in a lamp for a locomotive head-light, because such a reservoir may be placed behind the reflector of the head-light and still supply the wick freely by gravitation, whereas it would be impracticable to surround the wick-tube within the reflector with the reservoir, on account of the space occupied by it.

The perforated air-screen L for the interior current of air is combined with the wick-tube C in such manner that the air that enters the interior passage, S, of the hollow wick-tube is compelled to pass through it. This air-screen, like the exterior air-screen, is formed by preference of perforated metal, the holes of which are sufficiently fine to compel the air to enter with a low velocity and thus prevent material variations in the pressure of the air in the head-light from flickering the flame. In the present example, the air-screen for the interior current is secured to the drip cup K, which catches the overflow from the wick-tube. This drip-cup has an opening at its bottom, through which its contents can be withdrawn by removing the screw-plug M, which closes the opening. The portion of the drip cup that within the air-screen L is perforated with a number of large openings, *h h*, so as to permit the air which enters the air-screen to pass freely to the wick-tube.

In order that the flame of the lamp may be prevented from rising from the orifice of the cap-deflector in a cylindrical column of great height compared with its diameter, a button, *g*, is combined with the other members of the lamp in such manner as to compel the flame to spread as it rises from the cap-deflector. This button is supported upon a stem, *f*, which is sustained in the center of the wick-tube C by perforated diaphragms H I, which retain it securely in its position, but do not prevent the interior current of air from supplying the interior of the flame in the requisite quantity to secure perfect combustion. The perforated diaphragms, although not essential, are more useful than simple arms would be, because they not only sustain the stem of the button, but also act supplementally to the perforated air-screen L for the interior current of air, and render the flow of that current still more equable. The equability of the flow of this interior current is increased by the use of a third perforated diaphragm, J, placed at the lower end of the wick-tube.

The lamp thus described is used in connection with a glass chimney which rests upon a gallery, *t*, and produces the requisite draft of air through the air-screens. The gallery being close, or without openings, prevents currents of air from passing from the exterior of the lamp under the chimney and over the deflector to the flame. This feature of the lamp is of great importance in a locomotive head-light, because when the locomotive is in motion the head-light is filled with strong currents of air, and if such currents are permitted to have direct access to the flame above the deflector, they cause it to streak and flicker and to deposit soot upon the chimney, thereby obstructing the passage of light.

When the lamp is in operation, the vapors rising from the wick inflame gradually, and as the carbonaceous constituents at the lower part of the flame are not sufficiently heated to give out much light, the flame at the wick is mostly blue in color, as seen at Fig. 1. As, however, the flame extends upward within the combuston-chamber formed by the cap-deflector, the carbonaceous constituents attain a higher temperature, and when they reach the orifice of the cap-deflector are at a glowing heat. At the orifice a rapid contraction takes place, the external current of air is driven against the column of flame above the wick at a sharp angle, and the flame itself is forced into the inner current so that the products of the decomposition of the oil are brought into intimate contact with the air while at a glowing heat. The result is that intense combustion is produced, the greatest possible quantity of light is generated from the quantity of oil which the wick is capable of supplying, and consequently a most intense light is produced from a wick occupying a comparatively small space within the head-light.

The cap-deflector thus used by me as a member of some of my combinations must not be confounded with the deflecting-chimneys heretofore used with lamps. It constitutes no part of the chimney, but is a distinct instrument, and its construction as such permits it to be formed of metal, and to be used with a succession of chimneys, which, being of glass, are frequently broken, and require to be replaced.

It is an essential feature of my invention that the perforated air-screens of my lamp have free access to the air within the head-light, so that the air may be supplied to them in the requisite quantity to insure the combustion of the oil which the wick is capable of supplying, because the small perforations compel the air to pass through the screen at a low velocity, and therefore a large perforated surface must have access to the air, in order that the requisite quantity may pass through; and if either air-screen were so covered as to prevent the free access of air to it, the supply of air would be choked, and the efficiency of the lamp would be destroyed.

Having thus described a lamp embodying my improvements, I wish it to be understood that I do not claim to be the original inventor of any one of the individual instrumentalities or members of which my lamp is composed, as I am aware that such instrumentalities have been used before my invention; but, as such use was in combinations substantially different from those devised by me, I claim as my invention and desire to secure by Letters Patent—

1. The combination in a lamp of the following members—viz., the circular hollow wick-tube, perforated air-screen for the exterior current of air, and cap-deflector, substantially as set forth.

2. The combination in a lamp of the following members—viz., the circular hollow wick-tube, perforated air-screen for the exterior current of air, cap-deflector, and lateral oil-reservoir, substantially as set forth.

3. The combination in a lamp of the following members—viz., the circular hollow wick-tube, perforated air-screen for the exterior current of air, cap-deflector, and button, substantially as set forth.

4. The combination in a lamp of the following members—viz., the circular hollow wick-tube, perforated air-screen for the exterior current of air, cap-deflector, and thimble wick-holder, substantially as set forth.

5. The combination in a lamp of the following members—viz., the circular hollow wick-tube, lateral oil-reservoir, and perforated air-screen for the current of air in the interior of the wick-tube, substantially as set forth.

6. The combination in a lamp of the following members—viz., the circular hollow wick-tube, perforated air-screen for the interior current of air, lateral oil-reservoir, and cap-deflector, substantially as set forth.

7. The combination in a lamp of the following members—viz., the circular hollow wick-tube, cap-deflector, perforated air-screen for the interior current of air, and button, substantially as set forth.

8. The combination in a lamp of the following members—viz., the circular hollow wick-tube, cap-deflector, lateral oil-reservoir, perforated air-screen for the interior current of air, and button, substantially as set forth.

9. The combination in a lamp of the following members—viz., the circular hollow wick-tube, cap-deflector, and perforated air-screens for both the exterior and interior currents of air, substantially as set forth.

10. The combination in a lamp of the following members—viz., the circular hollow wick-tube, cap-deflector, perforated air-screen for the exterior current of air, and close chimney-gallery, substantially as set forth.

11. The combination in a lamp of the following members—viz., the circular hollow wick-tube, thimble wick-holder, cap-deflector, button, perforated air-screens for the exterior and interior currents of air, and lateral oil-reservoir, substantially as set forth.

In testimony whereof I have hereto set my hand.

IRVIN A. WILLIAMS.

Witnesses:
GEO. H. COLLINS,
HENRY ZEIMER.